United States Patent [19]

Caine

[11] Patent Number: 5,449,066
[45] Date of Patent: Sep. 12, 1995

[54] STORAGE APPARATUS FOR A COMPUTER DISC AND RELATED PRINTED MEDIA

[76] Inventor: Melvin E. Caine, 313 S. Bobbin Mill La., Broomall, Pa. 19008

[21] Appl. No.: 127,715

[22] Filed: Sep. 28, 1993

[51] Int. Cl.⁶ .............................................. B65D 85/57
[52] U.S. Cl. ..................................... 206/232; 206/308.3
[58] Field of Search ............... 206/232, 307, 309, 312, 206/313, 387, 444, 308.3; 229/1.5 R, 72

[56] References Cited

U.S. PATENT DOCUMENTS

| | | | |
|---|---|---|---|
| 3,058,506 | 10/1962 | Parisi | 229/72 |
| 3,464,135 | 9/1969 | Eidinger | 206/232 |
| 4,518,275 | 5/1985 | Rauch, III et al. | 206/387 |
| 4,535,930 | 8/1985 | Ward | 229/72 |
| 4,566,590 | 1/1986 | Manning et al. | 206/232 |
| 4,643,301 | 2/1987 | Hehn et al. | 206/387 |
| 4,717,021 | 1/1988 | Ditzig | 206/387 |
| 4,793,477 | 12/1988 | Manning et al. | 206/232 |
| 4,899,879 | 2/1990 | Rosen | 206/232 |
| 5,022,522 | 6/1991 | Kennedy | 206/232 |
| 5,168,988 | 12/1992 | Johnnston | 206/232 |
| 5,207,717 | 5/1993 | Manning | 206/232 |
| 5,288,144 | 2/1994 | Guderyon | 206/232 |

*Primary Examiner*—Jimmy G. Foster
*Attorney, Agent, or Firm*—Robert S. Lipton; Lipton & Stapler

[57] ABSTRACT

A carrier or receptacle for a computer disc and printed matter relating to its contents is disclosed. It is comprised of a sheet of semi-rigid, durable material such as paperboard or spunbonded olefin fabricated to a specific configuration and having score lines at various locations such that flaps and hinges are formed to enable folding of the sheet into a multi-pocket storage apparatus. The pocket designated for the storage of the computer disc is dimensioned so as to permit its easy insertion and removal and to further permit the user to view the identification label of the disc when stored. One or more additional pockets for the retention of information cards or other media, containing printed matter, are also provided and have open or transparent windows to enable viewing of the printed information when inserted. The dimensions of the subject device closely conform to those of the disc stored therein such that storage of both, within conventional disc storage cabinets and the like, is made possible.

8 Claims, 7 Drawing Sheets

STORAGE APPARATUS FOR A COMPUTER DISC AND RELATED PRINTED MEDIA

FIELD OF THE INVENTION

The subject invention is directed generally to an improved computer disc storage device whereby both the disc and replaceable media embodying printed matter relating to the disc's contents may be stored together, viewed by the user without removal from their protective sleeves and retained in conventional disc storage units.

BACKGROUND OF THE INVENTION

Computer discs are manufactured to various standard dimensions and are customarily comprised of a flexible magnetic disc permanently housed in a flexible or rigid outer casing. Sometimes referred to as "floppy disks" or "diskettes", these recording media are capable of storing voluminous amounts of information (along the order of 1.4 million bytes for a high density floppy disc) in the form of applications programs, for example word processing, spreadsheet and data base programs, and their corresponding files and data.

Heretofore, it has been the conventional practice to print the general contents of the disc on a separate label and to subsequently affix the label on a predesignated portion of the casing's outer surface. This practice enables the user to quickly reference the disc's contents without the time consuming process of removing the disc from its protective sleeve, inserting it into a computer and pulling up the directory on screen for review. But, due to the ever increasing storage capacities of magnetic recording media it has become impractical, if not impossible, to maintain a current printed directory of a disc's contents on the limited surface area provided by the label.

Moreover, the ease and frequency with which files may be revised, added or removed from the disc, consequently results in labels with multiple erasures which are aesthetically unappealing. Ultimately, these labels must be removed and replaced with new ones. Those familiar with this process will readily attest to the difficulty associated with removal of uncooperative adhesives; a task considered tedious, time consuming and undesirable. Some users prefer to paste new labels over old ones, a practice which is not only aesthetically unappealing, but one which may ultimately affect the disc's ability to be inserted into the drive, due to excessive label build-up.

Efforts were made to provide additional surfaces upon which printed matter could be displayed, beyond that associated with the disc label. U.S. Pat. No. 5,119,933 issued Jun. 9, 1992, to Taylor is a recent example. The Taylor reference teaches a semi-rigid envelope-like body which is actually fixedly attached to the computer disc. All elements of this sleeve are intended to provide amplified areas for printed indicia or other notation. While a greater amount of printed information can, in fact, be stored on the Taylor device, it has limited practicality because, like a label, there is a limited amount of space for the printed matter and it is meant to be a permanent attachment. Here again, the continual process of revising, adding and deleting printed matter from the sleeve and adding new information ultimately results in an unclean, unappealing body surface. It is clear that a significant need exists for a means of storing both a replaceable printed directory of disc contents together with the disc and its identification label. Further, a significant need exists for a device capable of storing multiple copies of the disc's directory, sorted according to various fields, such as by file name, extension, date and otherwise, because the utility of the printed contents of the disc is thereby increased geometrically.

An earlier reference, U.S. Pat. No. 4,566,590, issued Jan. 28, 1986, to Manning et al., combined a storage pouch for magnetic recording media and a separate enclosure for holding printed information. The enclosure is composed of transparent material so that the printed matter may be viewed by the user without the necessity of removing the medium upon which it is recorded. The Manning invention was intended to be used for the storage of a greeting card together with a cassette tape or phonorecord, for instance, and therefore did not address the specific needs of computer disc users as further discussed below.

More particularly, as individuals became more proficient with computers and their many applications, it naturally followed that the average user experienced a growth in the amount of information stored on the discs as well as the number of discs used for information backup purposes. Many users now find it desirable to designate a particular disc for storage of specific subject matter such as financial or correspondence files, for example. As the number of subjects grows, so do the number of requisite discs and the need for ready access to disc contents, via a functional directory as described above. The market has responded by providing users with a myriad of disc storage containers which accommodate from one or two discs up to several hundred. But, these now conventional storage devices are limited in that they are designed to accommodate only diskettes themselves, and not the correlating media for printed information relating to the disc's contents. For instance, like other prior art storage devices, the Taylor device described above is bulky in its construction and incapable of being stored within a conventional disc cabinet. Similarly, German Patent DE 3400024 A1, which teaches a disc storage sleeve having an additional compartment for receiving an information card, is neither capable of, nor intended to be, stored within conventional disc cabinets, boxes, or containers.

The subject invention offers a comprehensive solution to the shortcomings of the above described prior art by providing an improved computer disc storage device whereby both the disc, and printed matter relating to its contents, may be stored together in a single unit which in turn is capable of being stored in conventional disc storage cabinets and the like. It also provides a new level of convenient access to the expanding information as to the contents of the disc.

SUMMARY OF THE INVENTION

The subject invention more particularly provides a novel carrier or receptacle for a computer disc and replaceable printed matter relating to its current contents, comprised of a sheet of semi-rigid, durable material such as paperboard or spunbonded olefin (sold under the trade name "Tyvek" by The DuPont Company) fabricated to a specific configuration and having score lines at various locations such that flaps and hinges are formed to enable folding of the sheet into a multi-pocket storage apparatus. The pocket designated for the storage of the computer disc is dimensioned so as to permit its easy insertion and removal. The transparent pocket permits the user to view the identification label embodying the directory of the contents of the disc, when stored. One or more additional pockets for the retention of information cards or other media, containing printed matter, are also provided and have open or transparent windows to enable viewing of the printed information. The dimensions of the subject device closely conform to those of the disc stored therein such that storage of both within conventional disc storage cabinets and the like, is made possible.

It is, therefore, a primary object of the subject invention to provide an improved computer disc storage device whereby both the disc, and printed matter relating to the disc's contents, may be stored together and conveniently viewed by the user, without removal from their protective pockets.

It is also a primary object of the subject invention to provide a multi-pocket storage device for a computer disc, and printed matter relating to its contents, which is itself capable of being stored in conventional disc storage units.

Another object of the subject invention is to provide a storage receptacle for computer discs that is static free and permits easy insertion and removal of the disc by the user.

It is also an object of the present invention to provide one or more storage receptacles for media containing printed matter which, when inserted, will not obstruct the user's view of the disc identification label.

It is another object of the present invention to provide receptacles for a disc, and media containing printed matter relating to its contents, which provides adequate protection for each from the elements, dust and bending.

Still another object of the present invention is to provide a storage apparatus for a disc, that is simple in its construction and inexpensive to manufacture.

Other objects and advantages of the present invention will be apparent upon reference to the accompanying description when taken in conjunction with the following drawings.

BRIEF DESCRIPTION OF THE DRAWINGS

FIG. 4A through FIG. 7A are front views of the invention of FIG. 1 illustrated at various stages of its construction.

FIG. 4B through FIG. 7B are corresponding sectional views of the illustrations of FIGS. 4A through 7A.

DETAILED DESCRIPTION OF THE PREFERRED EMBODIMENT

Figure 1:
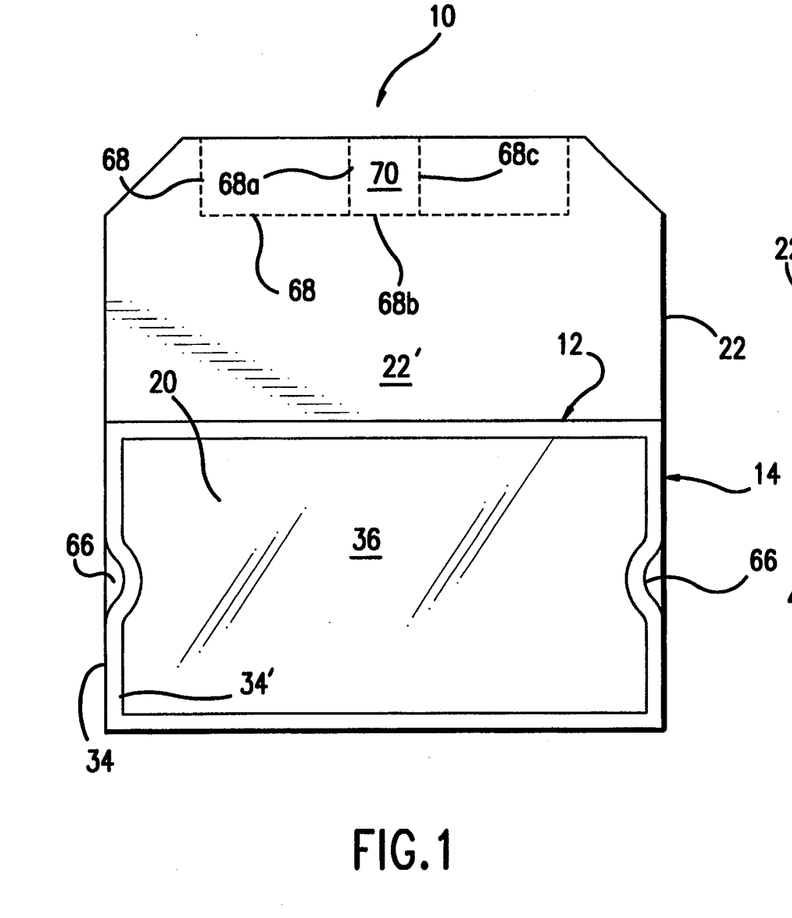
FIG. 1 is a front view of the subject storage device for a computer disc, and medium capable of embodying information relating to its contents in its assembled configuration.
Figure 2:
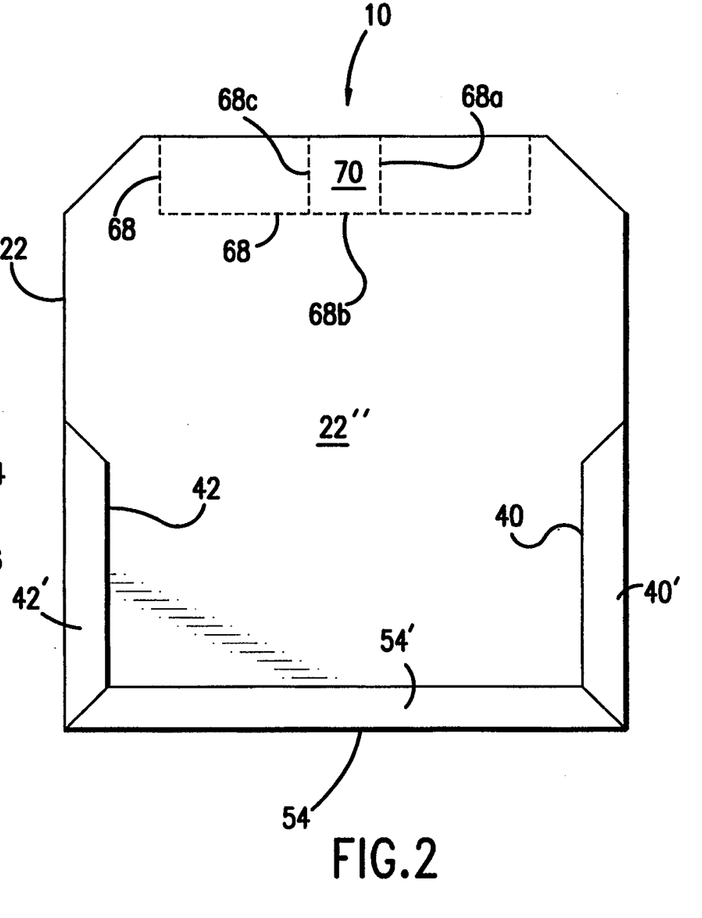
FIG. 2 is a rear view of the invention of FIG. 1.

Reference is now made to FIGS. 1 and 2 in which there is illustrated in diagrammatic form, front and rear views, respectively, of a preferred embodiment of the subject multi-pocket storage sleeve designated generally by reference numeral 10. A first pocket 12 is provided for receiving securely therein, a computer disc (not shown) having an identification label which may be entirely or partially exposed to view by the user. A second pocket 14 is further provided for receiving a medium such as a card, for instance, capable of embodying printed indicia relating to the disc's contents. More specifically, it is envisioned that cards retained in second pocket 14 depict a current list of files contained on the disc, as well as other information considered pertinent to the user. This information can itself be generated in label or card form by a software program designed for this task and sold in combination with sleeve 10.

Figure 3A:
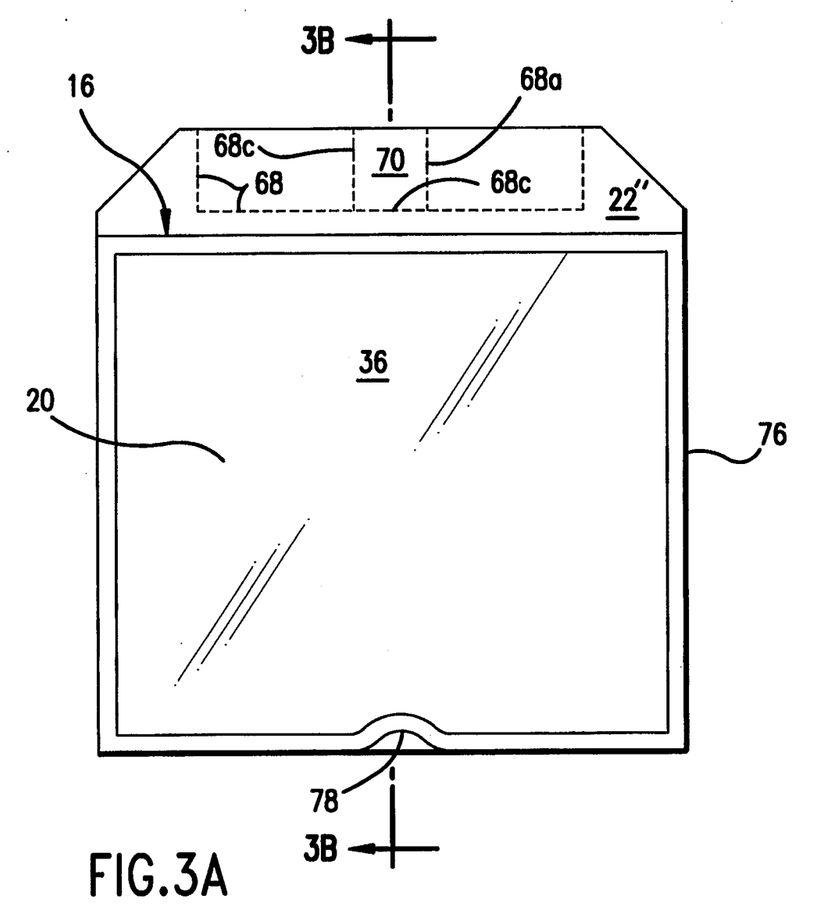
FIG. 3A is a rear view of another embodiment of the subject storage device, wherein a third pocket is provided on its rear face, having a window to permit viewing of the information printed on the medium contained therein.
Figure 3B:
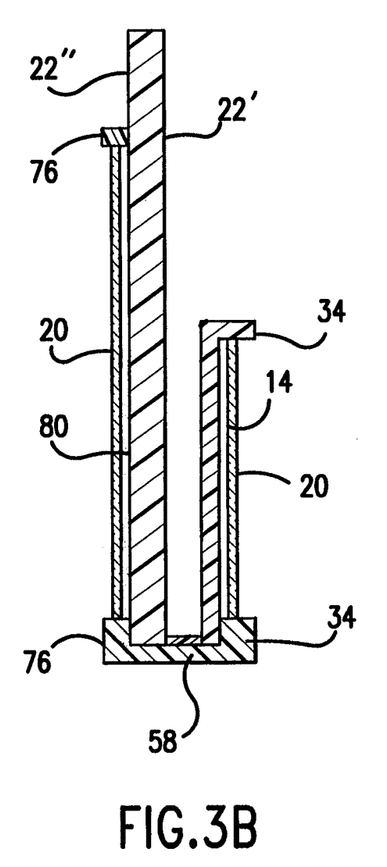
FIG. 3B is a sectional view of the invention of FIG. 3A.

In another embodiment of the invention, a third pocket 16 is provided (FIGS. 3A and 3B) on the reverse side of sleeve 10 to receive additional information similar to that stored in second pocket 14. Note that third pocket 16 may be constructed so as to provide a relatively large surface area, greater than that of second pocket 14 and, therefore, is capable of holding a greater amount of information for display. Both pockets 14 and 16 are comprised of front and rear panels; the former panel of each is modified to provide a framed border defining an open window through which the inserted information may be viewed. A piece of clear plastic or other transparent material is preferably affixed to the inner surface of frame and across window to afford additional protection to the printed media contained in each pocket.

Figure 4A:
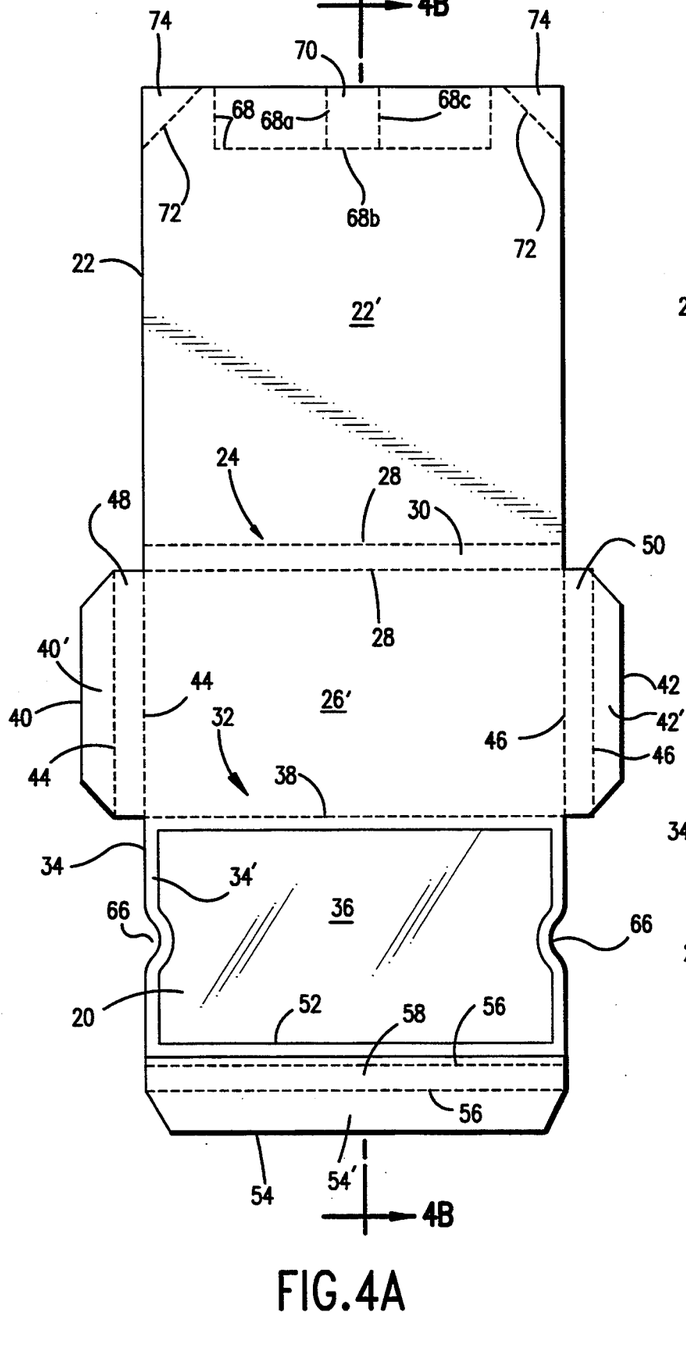
Figure 4B:
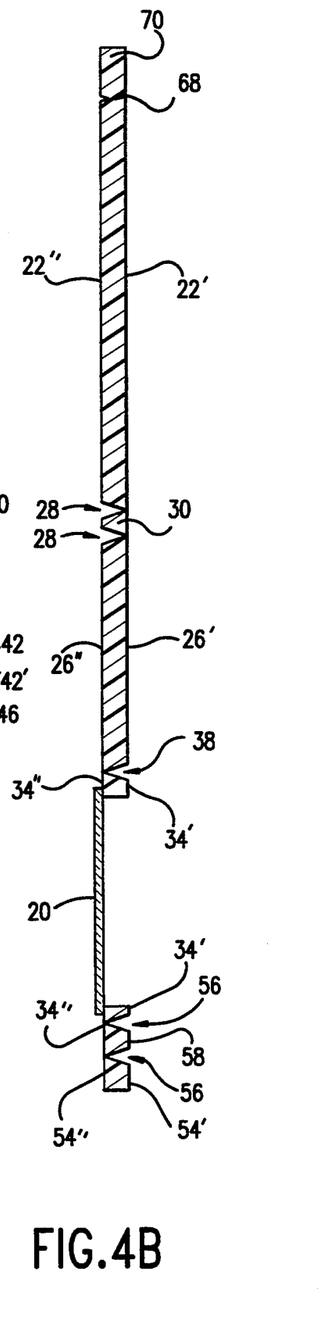

The specific features and advantages of the subject invention, described generally above, may best be appreciated upon reference to FIGS. 4A through 7A and corresponding cross sectional FIGS. 4B through 7B which together illustrate the invention at various stages of its construction. Referring now to FIGS. 4A and 4B in particular, sleeve 10 is preferably comprised of a sheet of semi-rigid material such as paperboard or spunbonded olefin (sold under the trade name "Tyvek" by the DuPont Company) cut into the shape illustrated.

A first panel 22, having front face 22' and back face 22", is of square dimension and is cut slightly larger than the disc which it will protect (usually 3½" or 5¼"). First panel 22 terminates at its lower edge 24 to abut a second panel 26, having front face 26' and back face 26". A first pair of score lines 28,28, extending horizontally in parallel fashion the width of first panel 22, define a relatively thin rail 30 disposed between first panel 22 and second panel 26.

Second panel 26 terminates at its lower edge 32 to abut a frame 34, having front face 34' and back face 34", and defining a window 36 of rectangular configuration. A single horizontally extending score line 38 is disposed between the width of second panel 26 and frame 34 and functions as a hinge connecting each. Second panel 26 is adapted with left tab 40, having front face 40' and back face 40", and right tab 42, having front face 42' and back face 42". A second and third pair of score lines 44,44 and 46,46, respectively, each extend vertically along the sides of second panel 26 in parallel fashion to define left and right side panels 48 and 50 of sleeve 10 when in its assembled configuration.

Frame 34 terminates at its lower edge 52 to abut a bottom tab 54, having front face 54' and back face 54". A fourth pair of score lines 56,56, extending horizontally in parallel fashion the width of frame 34, also function as hinges and define therebetween the base 58 of sleeve 10 when in its assembled configuration.

Figure 5A:
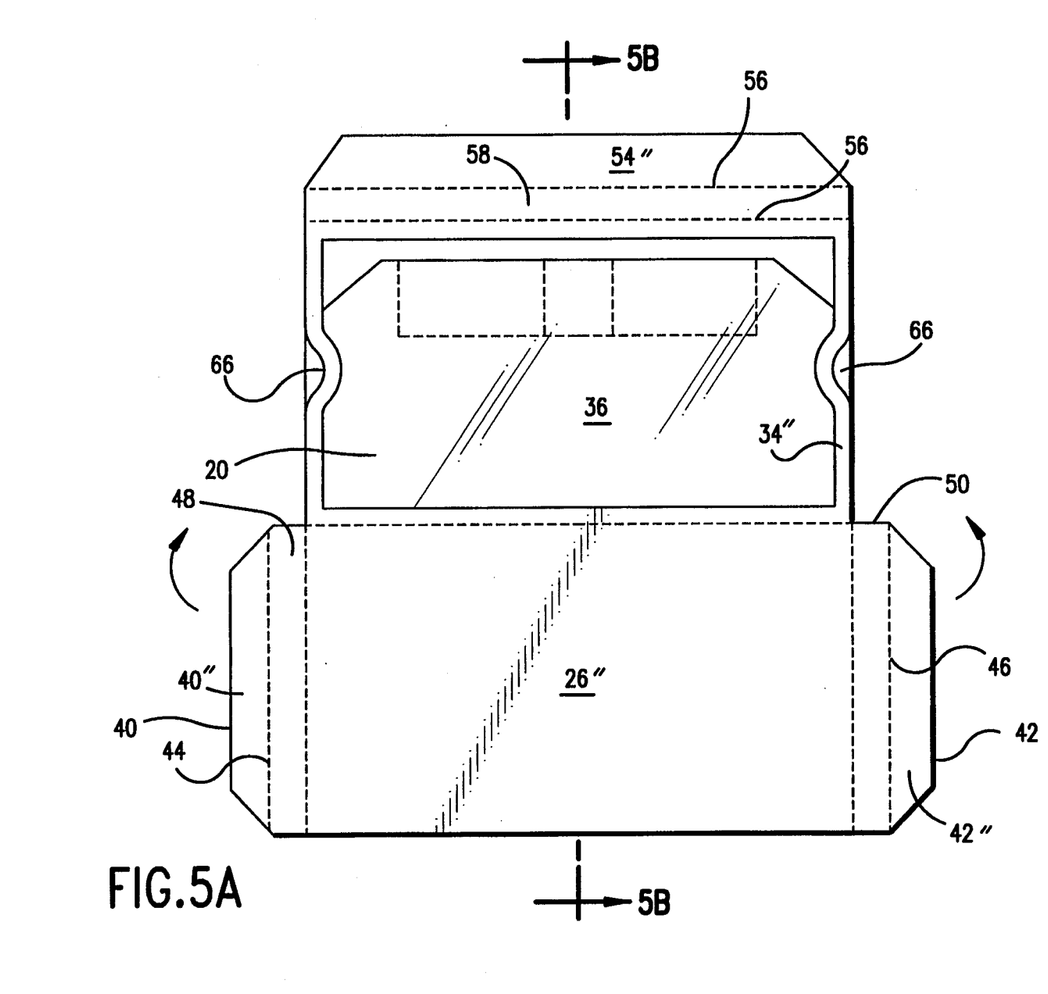
Figure 5B:
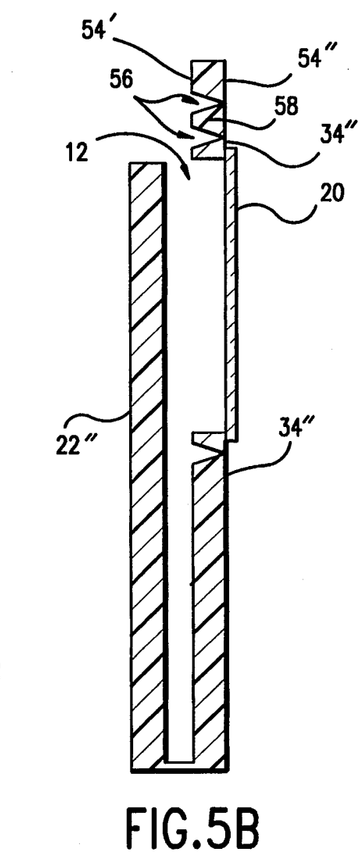

Referring now to FIGS. 5A and 5B, it can be observed that score lines 28,28 function as hinges to permit front face 26' of second panel 26 to be folded over upon front face 22' of first panel 22. In this intermediate configuration, front face 30' of rail 30 serves as the floor or bottom support for a computer disc stored in first pocket 12. Left and right tabs 40 and 42, respectively, are folded rearwardly such that their respective front faces 40' and 42' contact the back face 22' of first panel 22. This folding is facilitated by scores 44,44 and 46,46 which function as hinges. In this configuration, side panels 48 and 50 form the balance of the enclosure of first pocket 12. Glue or other fixative means are employed to permanently adhere tabs 40 and 42 to the back face 22' of first panel 22.

Figure 6A:
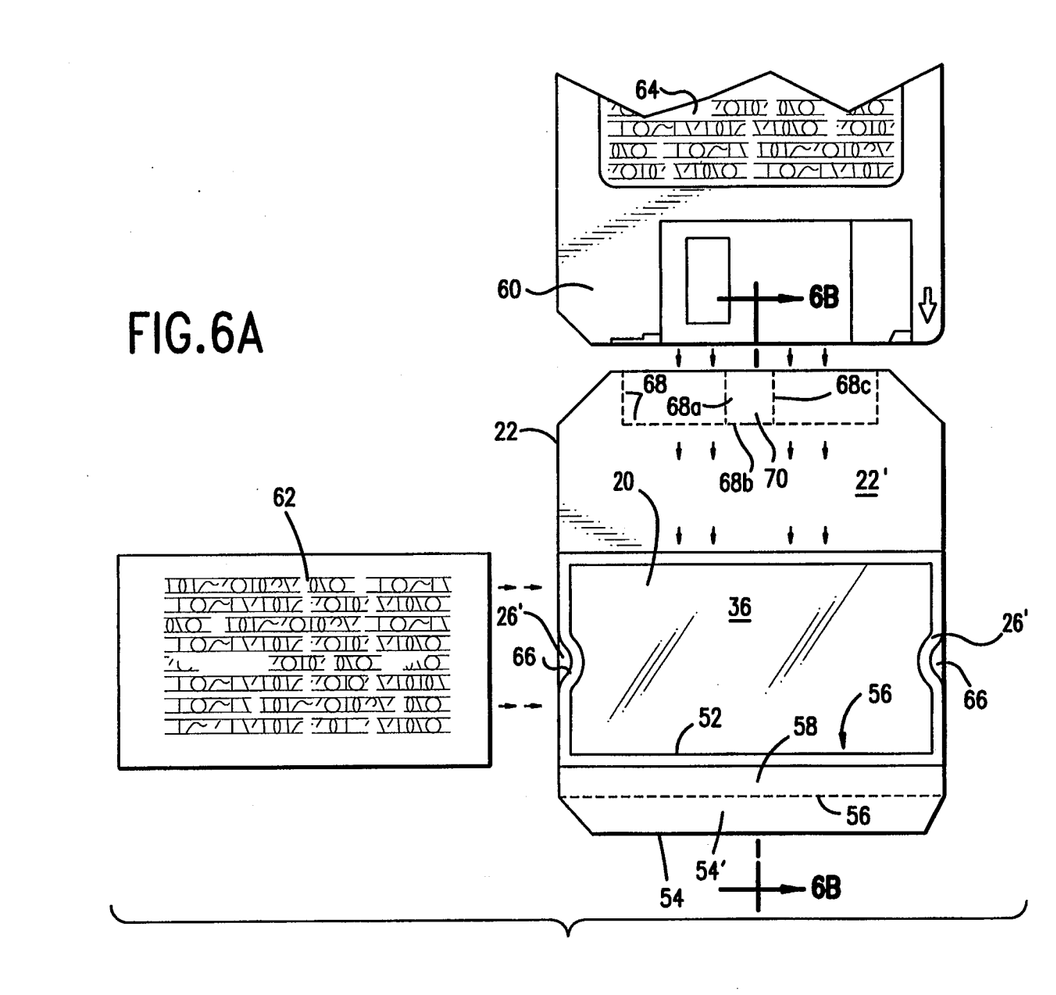
Figure 6B:
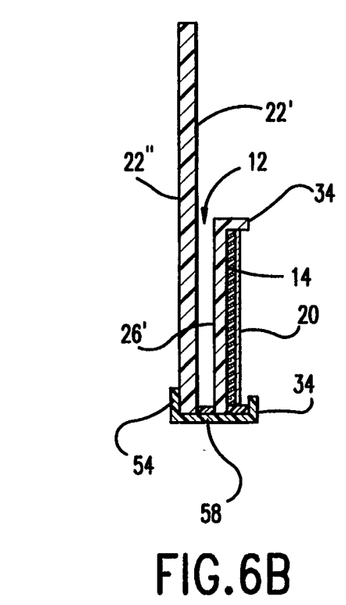
Figure 7A:
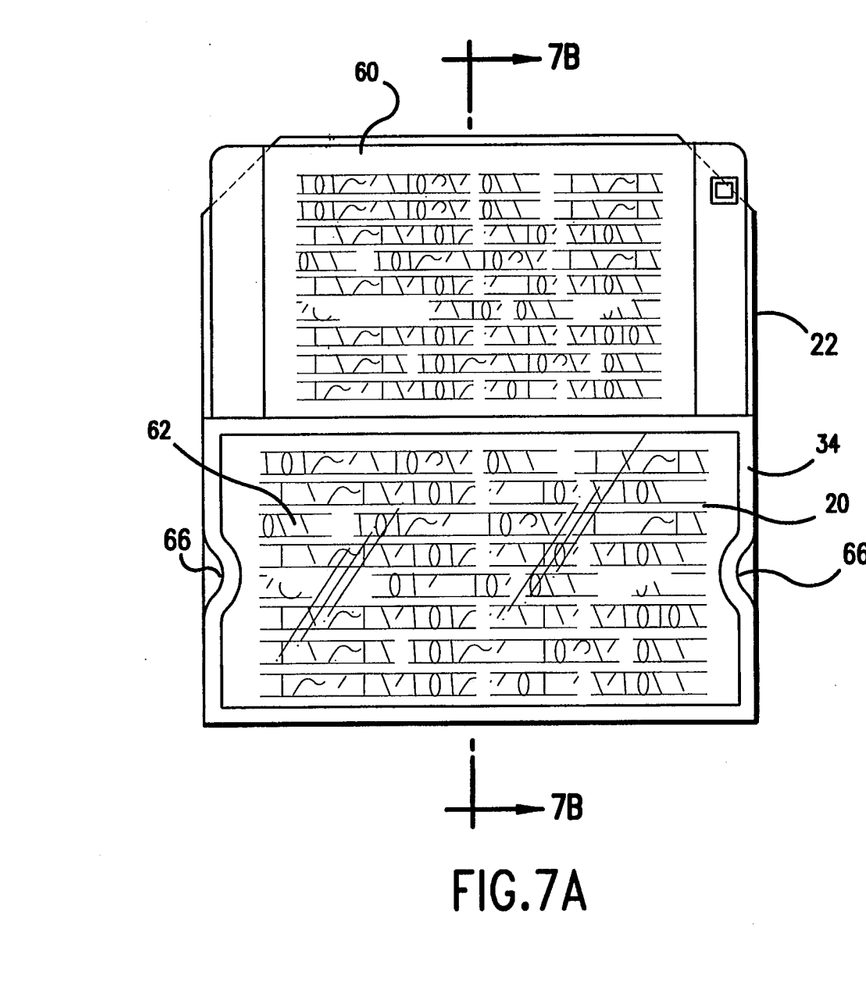
Figure 7B:
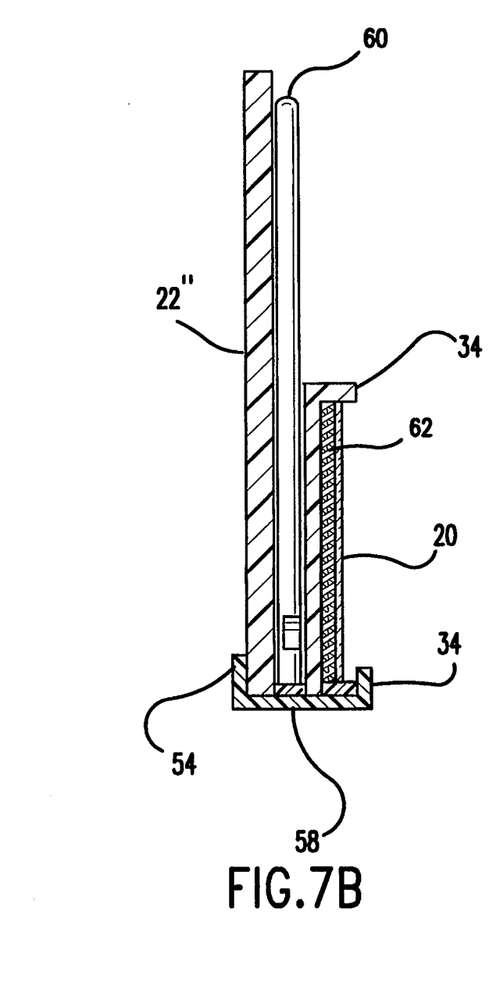

Referring now to FIGS. 6A and 6B, it can be observed that score line 38 facilitates the folding over of frame 34 upon second panel 26 such that the back face 34" of the former, engages the back face 26" of the latter. Once bottom tab 54 is folded rearwardly about score lines 56 such that base 58 overlaps rail 30 and the back face 54" of tab 54 engages the back face 22" of first panel 22, the assembled configuration of the subject device is accomplished. It is in this configuration that a computer disc 60 and card or other media 62 containing printed matter may be slidably received in pockets 12 and 14, respectively (FIGS. 7A and 7B). Here again, glue or other fixative means are first employed to permanently adhere tab 54 to first panel 22.

It is in the final configuration of FIGS. 7A and 7B that the many advantages of the subject invention may be understood. Note that the relative height and orientation of second pocket 14 provides an unobstructed view of the identification label 64 of disc 60 when stored in first pocket 12. Note further that frame 34 may be adapted with one or more notches 66 which facilitate lateral insertion and removal of media 62 to and from second pocket 14. In the preferred embodiment of the subject invention, a transparent sheet 20 of plastic or other suitable material is heat welded or otherwise permanently affixed to the back face 34" of frame 34 to provide a protective barrier between the environment and the media 62 stored in second pocket 14 while preserving visibility of the printed matter embodied thereon.

Referring once again to FIG. 2, it can be appreciated that left and right tabs 40 and 42, as well as bottom tab 54, have been decornered to provide a trapezoidal shape which, when folded about first panel 22, prevents their overlapping. This reduces the overall thickness of sleeve 10 enabling the invention, in combination with the disc 60 and printed media 62 which it is designed to retain, to be stored in many conventional disc storage cabinets.

An added feature of the subject computer disc storage sleeve relates to the perforation of first panel 22, as best shown in FIGS. 1 and 2, for the purpose of providing optional disc handling and identification means. More specifically, a plurality of vertical and horizontal perforations 68 enable the user to remove selected rectangular sections of first panel 22 so that portions of label 64, which typically occupy the top portion of the disc's back surface, may be viewed when disc 60 is stored in first pocket 12. For instance, removal of the centermost section 70 may be accomplished by tearing along perforations 68a, 68b and 68c to provide a rear window for viewing a numerical code placed on label 64 for identification of disc 60 in accordance with the users own organizational protocol.

Two additional perforations 72 (FIG. 4A) run diagonally across the corners 74 of first panel 22. One or both corners 74 are removed in the preferred embodiment of the invention, (see FIGS. 1 and 2, for example) so that disc 60 may more easily be grasped for removal from storage sleeve 10.

Insertion and removal of disc 60 are also facilitated by the application of a wax film or other such substance to the inner walls of first pocket 12, comprising the front face of first and second panels 22 and 26, when paperboard is used as the article of manufacture. Treatment of pocket 12 in this manner provides a smooth, non-stick surface and increases the life of the device. Sleeve 10 may also be treated to be static free, whether manufactured of paperboard or olefin.

Figure 8:
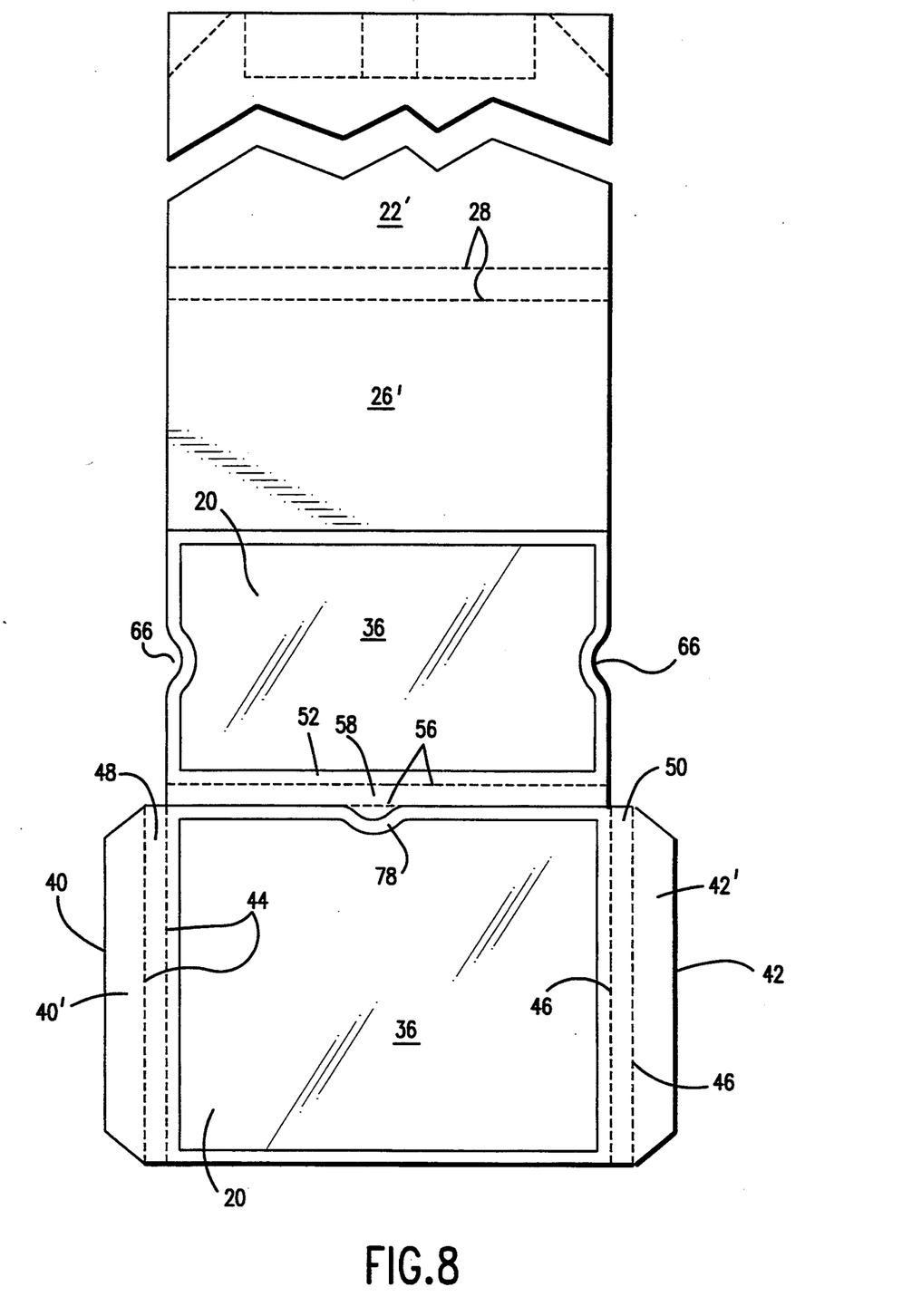
FIG. 8 is a front view of the starting configuration used to construct the invention of FIG. 3.

As mentioned above, another embodiment of the invention includes a third pocket 16 (FIGS. 3A and 3B) on the reverse side of sleeve 10 to receive additional information similar to that stored in second pocket 14. Referring now to FIG. 8, it can be observed that bottom tab 54 has been modified into a second frame 76 and that left and right side tabs 40 and 42 have been relocated from second panel 26 to second frame 76. Frame 76 is folded in a manner similar to that of the bottom tab 54 which it replaced to overlie the majority of back face 22" of first panel 22. In this embodiment, tabs 40 and 42 are folded forwardly and affixed to the front face 34' of frame 34. A center notch 78 is provided to facilitate insertion and removal of media 62 which, in this embodiment, is accomplished through opening 80 of third pocket 16.

Although the present invention has been described with reference to the particular embodiments herein set forth, it is understood that the present disclosure has been made only by way of example, and that numerous changes in details of construction may be resorted to without departing from the spirit and scope of the invention. Thus, the scope of the invention should not be limited by the foregoing specifications, but rather only by the scope of the claims appended hereto.

What is claimed is:

1. A multi-pocket holder for a computer disc and media capable of embodying printed indicia related to the contents of the disc, said holder comprising a first pocket and a smaller second pocket in overlapping relationship; said first pocket being defined by front, back, side and bottom panels for the storage of a disc; said second pocket having a window to permit viewing of printed indicia stored in said second pocket; and said back panel is perforated to permit the removal of a rectangular section thereby forming a window through which that portion of a label affixed to the back of the disc may be viewed.

2. The multi-pocket holder of claim 1, further comprising a third pocket in overlapping relationship with said first pocket; said first and third pockets sharing a common said side panel; said third pocket further having a window to permit viewing of printed indicia stored in said third pocket.

3. The multi-pocket holder of claim 1, wherein said front panel is of shorter dimension than said back panel such that the label of a disc stored therebetween is visible when the disc is stored in said first pocket.

4. The multi-pocket holder of claim 1, wherein said window of said second pocket is comprised of transparent material.

5. The multi-pocket holder of claim 2, wherein said window of said second pocket and said window of said third pocket are comprised of transparent material.

6. The multi-pocket holder of claim 1, further comprising means for facilitating the insertion and removal of the disc and media embodying printed media.

7. The multi-pocket holder of claim 2, further comprising means for facilitating the insertion and removal of the disc and media embodying printed media.

8. The multi-pocket holder of claim 1, having dimensions capable of storage within disc storage units.

* * * * *